Figures 1, 2:
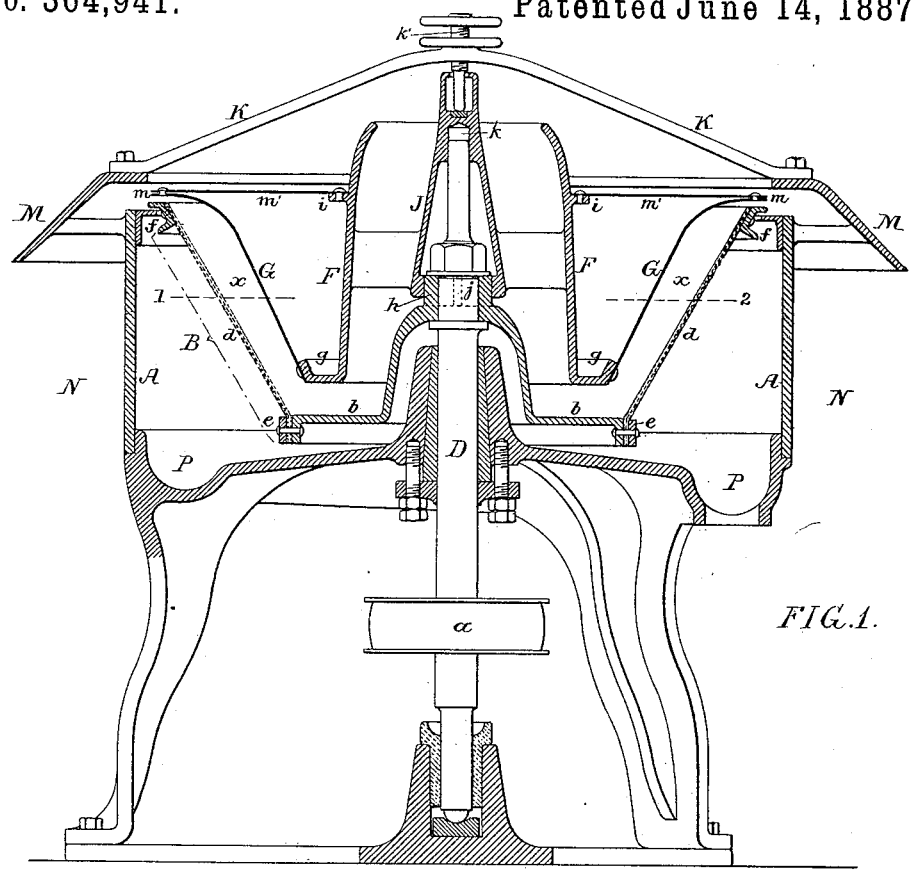

(No Model.)

R. B. LAFFERTY.
CENTRIFUGAL MACHINE.

No. 364,941. Patented June 14, 1887.

Witnesses:
Hamilton D. Turner.
David S. Williams

Inventor:
Robert B. Lafferty
by his Attorneys
Howson and Sons

UNITED STATES PATENT OFFICE.

ROBERT B. LAFFERTY, OF GLOUCESTER, NEW JERSEY.

CENTRIFUGAL MACHINE.

SPECIFICATION forming part of Letters Patent No. 364,941, dated June 14, 1887.

Application filed January 22, 1887. Serial No. 225,107. (No model.)

*To all whom it may concern:*

Be it known that I, ROBERT B. LAFFERTY, a citizen of the United States, residing in Gloucester, Camden county, New Jersey, have invented certain Improvements in Centrifugal Machines, of which the following is a specification.

My invention relates to that class of centrifugal machines in which the liquid portions of the mass subjected to the action of the machine are discharged through the perforated cage, while the dry or partially-dried granular portions of the mass are discharged over the top of the cage.

My invention comprises certain features in the construction of the machine whereby the area of the outlet for the granular portions of the mass is readily increased or diminished, and the jamming of the granular mass in the cage before reaching said outlet is prevented, the structure, moreover, being of simple and economical construction and comprising but few parts.

In the accompanying drawings, Figure 1 is a vertical section of a centrifugal machine constructed in accordance with my invention; and Fig. 2, a sectional plan view on the line 1 2, Fig. 1.

A is the outer fixed vessel or casing, within which is contained the rotating cage B, carried by a shaft, D, which is adapted to a bearing in the bottom of the vessel A and rests upon a suitable step on the floor or foundation upon which the machine is erected, rotary motion being applied to this shaft from any convenient counter-shaft by a belt adapted to a pulley, $a$, or in any other manner which may be found most convenient under the circumstances.

The cage B consists of the base $b$, secured to the shaft D, and an outer perforated wall, $d$, which is in the form of an inverted frustum of a cone, the lower edge of which is securely bolted to the base $b$, and confined thereto by means of a ring, $e$, while the upper portion of the cage is stiffened and strengthened by means of an outer ring, $f$, of U shape or other equivalent form in cross-section.

Centrally located within the cage B is a receiver, F, into which is discharged the fluid or semi-fluid mass to be drained, this receiver being in the form of a cylinder or bell, the lower end of which is some distance from the bottom of the cage and has a flange, $g$, to which is bolted the lower end of an inverted conical retaining-plate, G, the upper end, $m$, of which is flared outwardly, so as to project over the upper edge of the body of the cage and its stiffening-ring, deflection of the said upper end, $m$, of the retaining-plate being prevented by means of a bracing-ring, $m'$, extending inwardly therefrom to a flange, $i$, on the receiver.

The base $b$ of the cage has a central boss or projection, $h$, above which the shaft D projects to some distance, and the receiver F has a hollow hub, J, the lower portion of which fits snugly to said boss $h$, and is recessed for the reception of projecting splines or feathers $j$ therein, the upper portion of the hub having an opening, $k$, for the reception of the upper end of the shaft D. It will therefore be seen that the receiver F and retaining-plate G are caused to rotate with and at the same rate of speed as the cage B of the machine, and that said retaining-plate is rigidly held in its proper position in respect to the cage by reason of the extended bearing afforded by the long hub of the receiver.

The fluid or semi-fluid mass from which the liquid contents are to be drained is permitted to flow continuously into the receiver F, and passes beneath the bottom of the same and up through the flaring annular space $x$, between the lining of the cage and the internal retaining-plate, G. During its passage upwardly through this space the liquid portions of the mass are, owing to centrifugal force, caused to escape through the meshes of the cage-lining and through the openings in the perforated wall of the cage, so that the material which reaches the upper edge of the cage is in granular form and in a dry or partially-dry condition, and this material is delivered over the top edge of the cage through the space between said top edge and the overhanging portion $m$ of the retaining-plate G. It will therefore be seen that the speed at which the material travels up the inclined annular space between the cage-lining and the retaining-plate is dependent upon the area of this discharge-opening, and in order that this opening may be varied to accord with the character of the material being treated and the desired rate of flow of the same I provide the machine with a fixed yoke, K, which has a set-screw, K', bearing upon a block at the upper portion of the hub J of the receiver, the upward pressure of the material upon the plate G causing said hub to bear firmly against the set-screw, by manipulating which, therefore, the vertical position of the retaining-plate in respect to the cage may be readily varied and the area of the outlet-opening at the top of the cage regulated as desired.

In the present instance the yoke K is carried by an annular rim, M, which surrounds and overhangs the upper portion of the vessel A, and serves to receive and deflect downward the material discharged over the upper edge of the cage, this material being delivered onto the floor around the vessel A, while the liquid matter delivered from the cage is collected in a trough, P, at the bottom of said vessel and conveyed therefrom through any suitable discharge-pipe.

It will be observed that the retainer G is not concentric with the outer wall of the cage B, the space between the two gradually increasing in width from the bottom of the passage $x$ to the top of the same, so that the material is prevented from jamming in said passage and interfering with the free discharge over the top of the cage.

The outwardly-flaring upper portion, $m$, of the retainer G, forms a deflector, the vertical position of which governs the discharge of the material over the top of the cage, and by raising and lowering this deflector and the retainer simultaneously I insure the proper operation of the machine when the same is started. Under such circumstances the deflector bears against the upper edge of the cage and the material is allowed to flow into the cage until the chamber between the cage and retainer is filled with dry material, or at least until the upper portion of said chamber is so filled.

If the retainer was immovable and only the deflecting-plate adjustable, this material would have a tendency to stick in the cage and would not be discharged properly beneath the deflector when the latter was raised; but by making the deflector a part of the retaining-plate and lifting the latter simultaneously with the deflector, the dry material in the upper portion of the cage is at once relieved from pressure, and there is nothing to interfere with the free starting of the same as soon as the deflector is lifted.

I am aware that the combination of an inverted conical perforated basket with an inverted conical retaining-plate within the same is not new, such a combination having been shown, for instance, in the machine which forms the subject of Letters Patent No. 158,764, dated January 12, 1875, in which machine, however, the retaining-plate was not adjustable as in my machine, and was so constructed as to gradually contract the area of the annular space through which the material was caused to rise by the action of the machine, instead of gradually increasing the area, as described in my specification.

I am also aware that the inverted conical perforated basket of a centrifugal machine has been combined with a deflecting valve or plate located above the rim of the basket, and serving to direct the solid matters escaping over said rim into an outer receptacle independent of that which receives the liquid passing through the perforations of the basket, such construction being shown in United States Patent No. 59,956, dated November 27, 1866. I do not, therefore, broadly claim this feature; but

I claim as my invention and desire to secure by Letters Patent—

1. The combination of the self-discharging conical basket or cage of a centrifugal machine with a conical retainer contained within said cage, a deflector governing the flow over the delivery end of the cage, and means for adjusting both the retainer and the deflector, all substantially as specified.

2. The combination of the self-discharging conical basket or cage of a centrifugal machine with the deflector at the delivery end of the same, and a conical retaining-plate, the angle of which is different from that of the outer wall of the basket or cage, whereby the passage for the material is of greater size near the upper or delivery end of the cage than at the lower or receiving end, all substantially as specified.

3. The combination of the self-discharging conical basket or cage of a centrifugal machine, a central receiver within and communicating with the cage, a conical retaining-plate carried by said receiver and flared outwardly at the upper end to form a governing-valve for the cage, and means for raising and lowering said receiver, all substantially as specified.

4. The combination of the self-discharging conical basket or cage of a centrifugal machine, the base of which has a central projection or boss thereon, the driving-shaft projecting above said base, the receiver having a hollow hub adapted to said boss and to the upper end of the shaft, and a conical retaining-plate carried by the receiver and constructed to form a deflector at the delivery end of the cage, all substantially as specified.

5. The combination of the self-discharging conical basket or cage of a centrifugal machine, the central receiver having a conical retaining-plate forming a deflector at the delivery end of the basket, and a fixed yoke having a set-screw bearing upon the hub of said receiver, all substantially as specified.

6. The combination of the self-discharging conical basket or cage of a centrifugal machine with a conical retaining-plate within the cage, and with means for adjusting said plate so as to enlarge or contract the capacity of the space between the retaining-plate and the outer wall of the cage, all substantially as specified.

In testimony whereof I have signed my name to this specification in the presence of two subscribing witnesses.

ROBERT B. LAFFERTY.

Witnesses:
WILLIAM D. CONNER,
HARRY SMITH.